(12) United States Patent
Sakata (10) Patent No.: US 7,036,945 B2
(45) Date of Patent: May 2, 2006

(54) MANUAL MIRROR DEVICE

(75) Inventor: Ikuo Sakata, Zama (JP)

(73) Assignee: Ichikoh Industries, Ltd., Tokyo (JP)

( * ) Notice: Subject to any disclaimer, the term of this patent is extended or adjusted under 35 U.S.C. 154(b) by 0 days.

(21) Appl. No.: 10/852,284

(22) Filed: May 24, 2004

(65) Prior Publication Data

US 2004/0240091 A1    Dec. 2, 2004

(30) Foreign Application Priority Data

May 26, 2003    (JP)    ............................ P2003-147729

(51) Int. Cl.
  *G02B 5/08*    (2006.01)
  *G02B 7/18*    (2006.01)
(52) U.S. Cl. ...................... 359/841; 248/479
(58) Field of Classification Search ................ 359/841, 359/872; 248/549, 478, 479
  See application file for complete search history.

(56) References Cited

U.S. PATENT DOCUMENTS

| 4,789,232 A | 12/1988 | Urbanek |
| 2002/0048100 A1 | 4/2002 | Hoek |

FOREIGN PATENT DOCUMENTS

| DE | 41 41 163 C | 6/1993 |
| EP | 0 519 115 A | 12/1992 |
| EP | 0 527 455 A | 2/1993 |
| EP | 0 822 120 A | 2/1998 |
| GB | 2 374 578 A | 10/2002 |
| JP | 7-42724 | 8/1995 |
| JP | 9-99780 | 4/1997 |
| JP | 10-119644 | 5/1998 |
| WO | WO 00/67983 A1 * | 11/2000 |
| WO | WO 02/076790 A1 * | 10/2002 |

* cited by examiner

*Primary Examiner*—Mark A. Robinson
*Assistant Examiner*—Alessandro Amari
(74) *Attorney, Agent, or Firm*—Kilpatrick Stockton LLP

(57) ABSTRACT

A manual mirror device includes a mirror base, a shaft, a housing, a compression coil spring, a mirror unit, and engaging units. The mirror base is fixed to a vehicle. The shaft penetrates the mirror base and a lower portion of the housing. The housing turns integrally with the shaft. The compression coil spring generates elastic force for rotatably attaching the shaft and the housing to the mirror base. The mirror unit with a mirror is fitted to the housing. One engaging unit is provided on a surface of the shaft opposed to the mirror base. The other engaging unit is provided on a surface of the mirror base opposed to the shaft. The mirror unit is fixed to an operated position by engaging one engaging unit with the other engaging unit.

20 Claims, 11 Drawing Sheets

MANUAL MIRROR DEVICE

CROSS REFERENCE TO RELATED APPLICATIONS

This application claims benefit of priority under 35 U.S.C § 119 to Japanese Patent Application No. 2003-147729, filed on May 26, 2003, the entire contents of which are incorporated by reference herein.

BACKGROUND OF THE INVENTION

1. Field of the Invention

The present invention relates to a mirror device to be fixed to a vehicle. More specifically, the present invention relates to a manual mirror device configured to be capable of turning a mirror between an operated position and a folded position by manual operation.

2. Description of the Related Art

Figure 1:
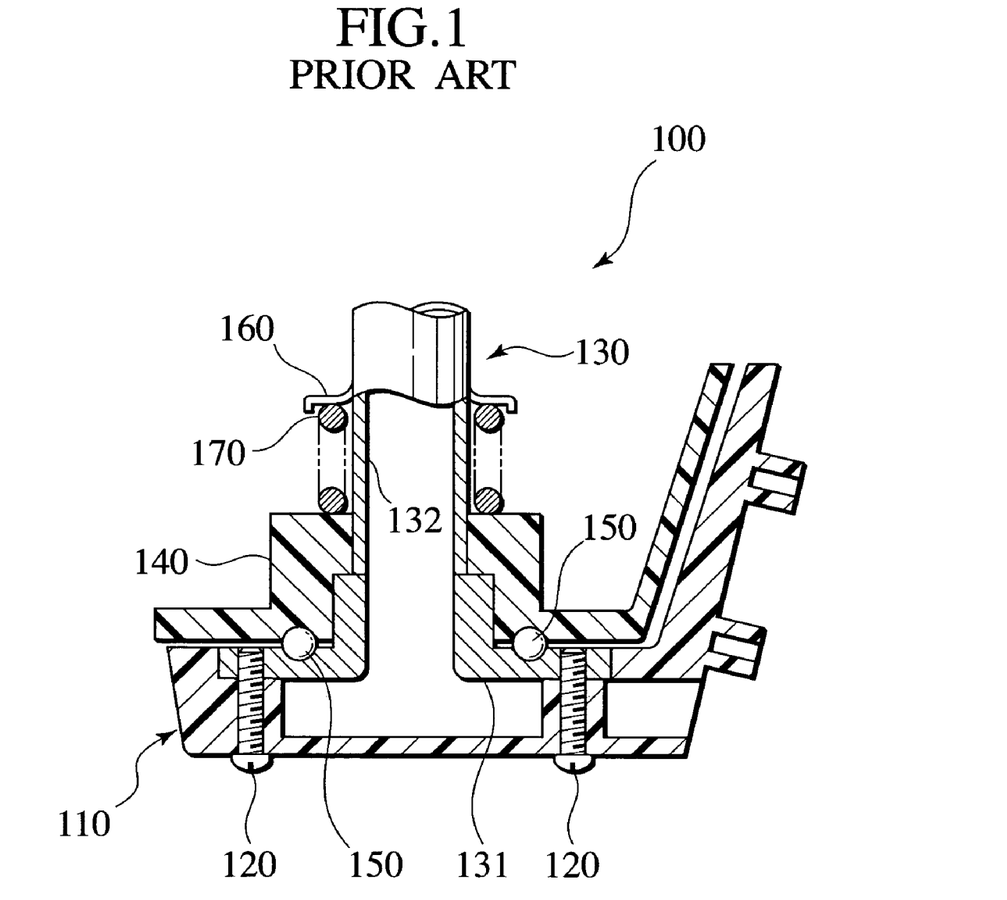
FIG. 1 is a cross-sectional view of a conventional manual mirror device.

As shown in FIG. 1, a manual mirror device 100 includes a mirror base 110, a plurality of screws 120, a shaft 130, a housing 140, a plurality of balls 150, a push nut 160, and a compression coil spring 170.

The mirror base 110 is made of resin and is fixed to a vehicle, more specifically, a car door. The shaft 130 is made of metal and has a lower portion to be fixed to the mirror base 110 by the screws 120. Also, the shaft 130 has an upper portion which penetrates a lower portion of the housing 140 to be housed in the housing 140. The housing 140 is made of resin and has a mirror unit (not shown) with a mirror in the interior of thereof The balls 150 are disposed between the housing 140 and a base portion 131 of the shaft 130. When the housing 140 is manually operated, the housing 140 turns around the shaft 130 by use of the balls 150. In this event, the balls 150 reduce friction between the base portion 131 and the housing 140.

In addition, the housing 140 attaches the balls 150 by pressure to the base portion 131 by use of the push nut 160 and the compression coil spring 170. The push nut 160 is fitted into a spindle 132 of the shaft 130. The compression coil spring 170 is disposed and compressed between the housing 140 and the push nut 160. In this configuration, the housing 140 attaches the balls 150 to the base portion 131 by elastic force of the compression coil spring 170. Accordingly, the housing 140 turns around the shaft 130 without wobbling.

However, in the manual mirror device 100, the number of components is increased because the screws 120 are applied to fix the shaft 130 to the mirror base 110. Also, an assembly operation is complicated because there is an operation for screwing the screws 120 into the mirror base 110 and the shaft 130.

Figure 2:
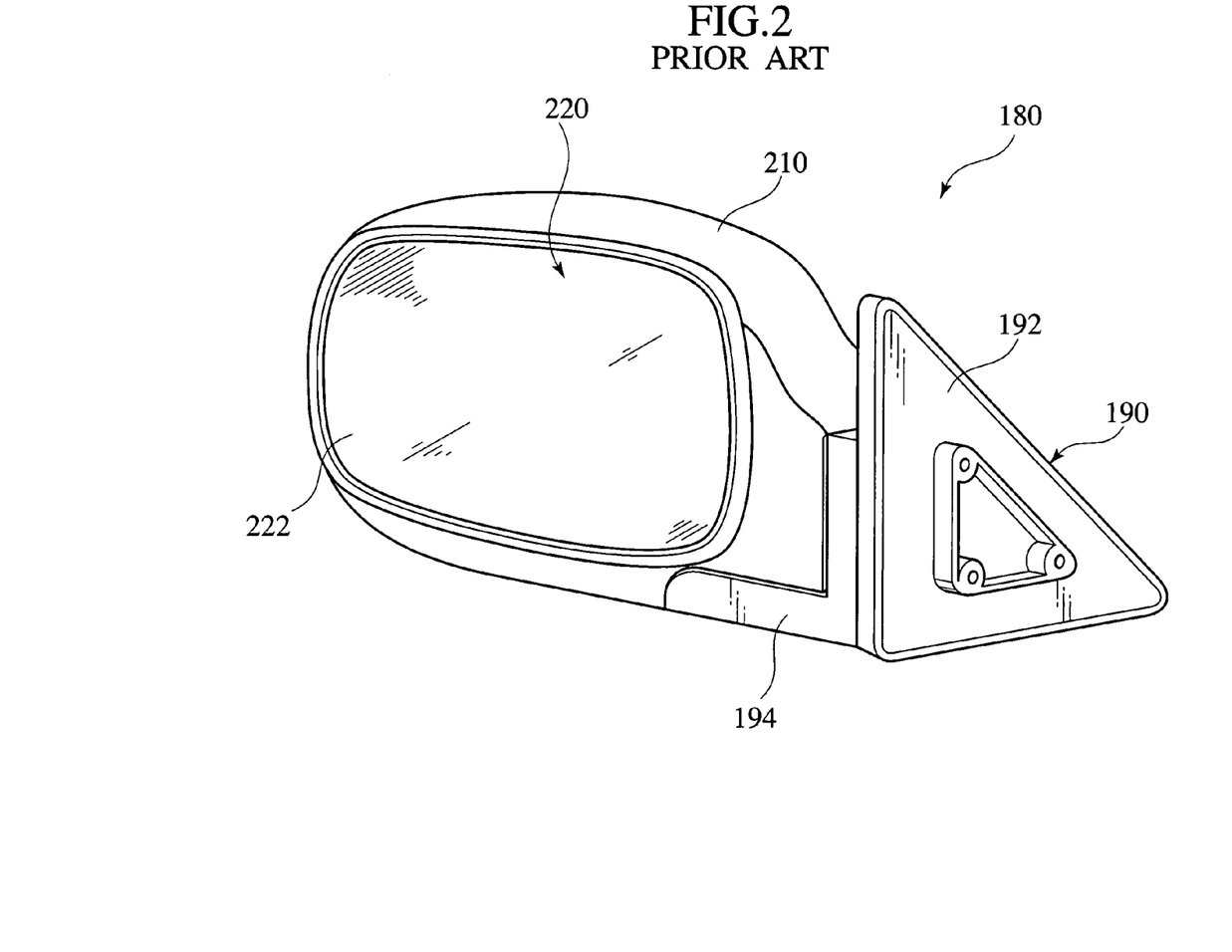
FIG. 2 is a perspective view of another conventional manual mirror device.
Figure 3:
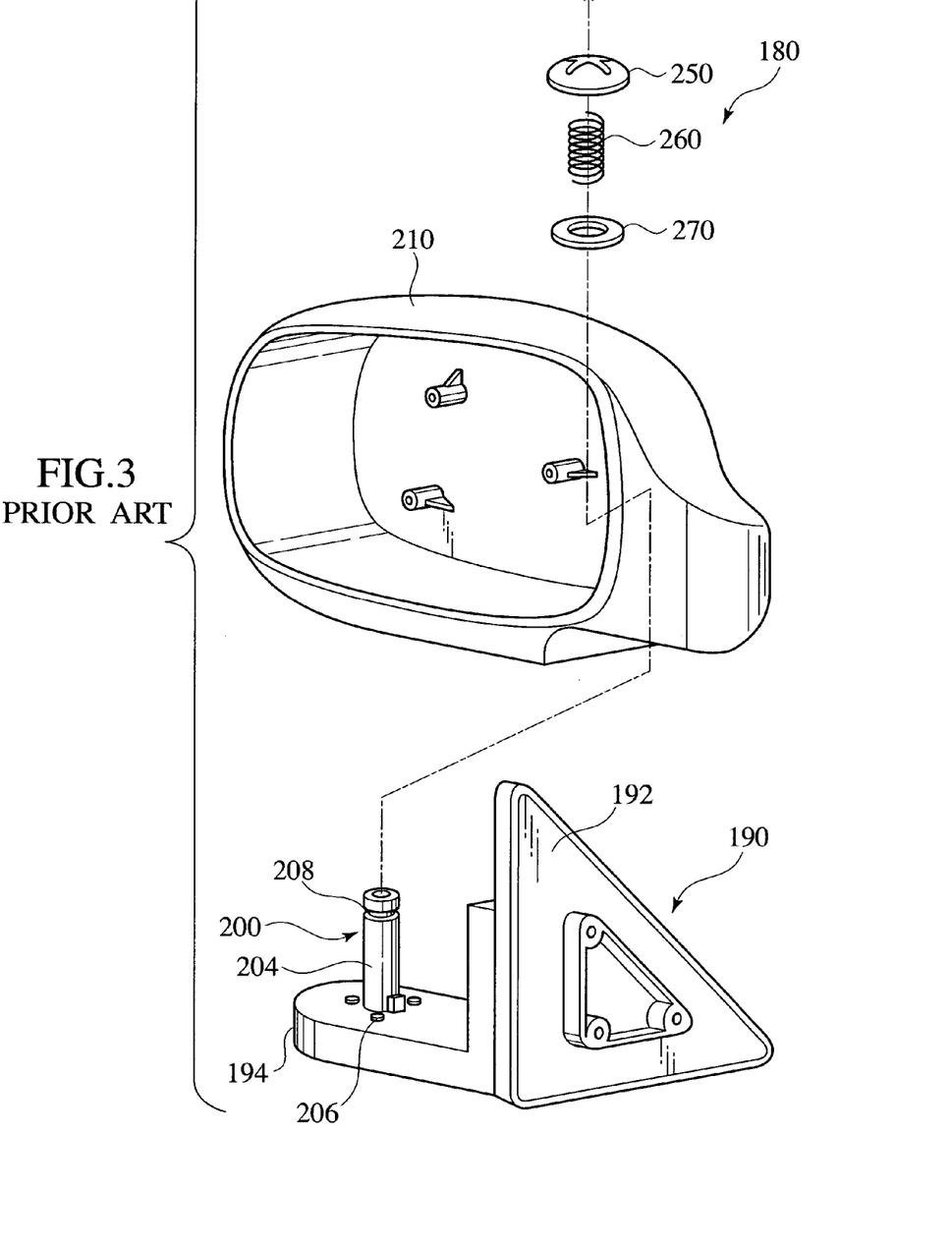
FIG. 3 is an exploded perspective view of another conventional manual mirror device.
Figure 4:
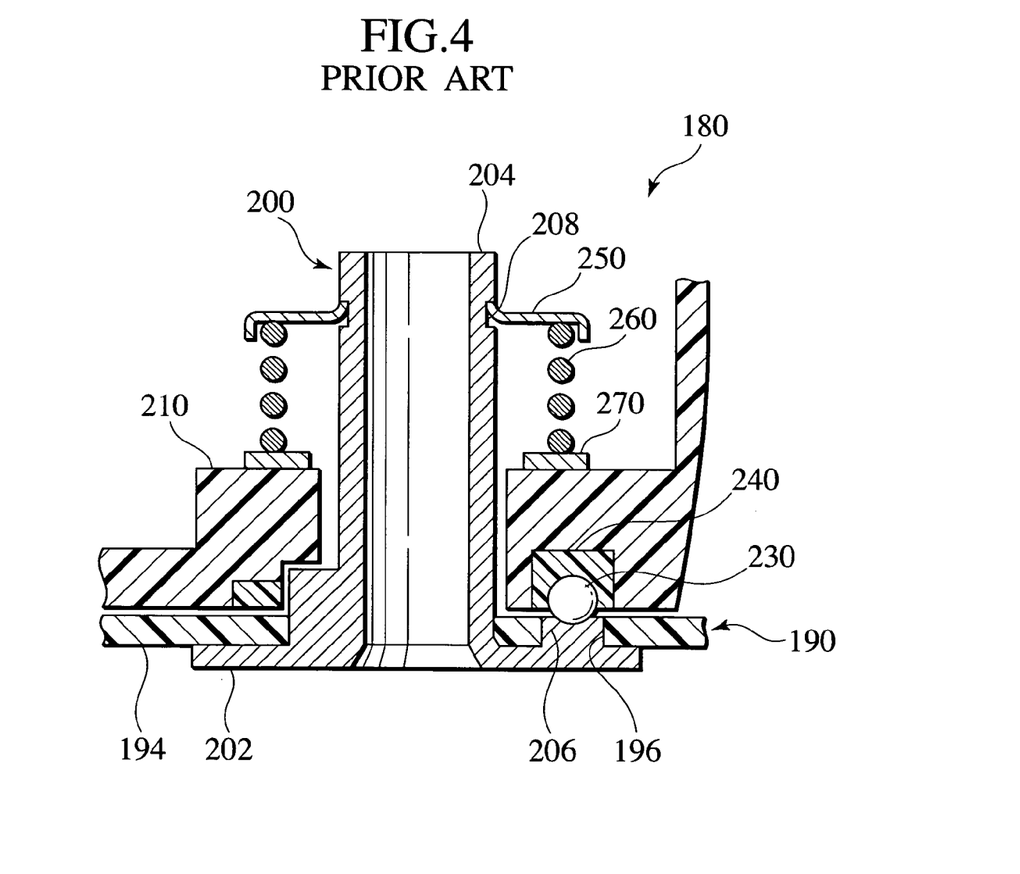
FIG. 4 is a cross-sectional view of another conventional manual mirror device.

As a device to solve the foregoing problems, Japanese Unexamined Patent Publication No. 9(1997)-99780 discloses a manual mirror device 180. As shown in FIGS. 2 to 4, the manual mirror device 180 includes a mirror base 190, a shaft 200, a housing 210, a mirror unit 220, a plurality of balls 230, washers 240, a push nut 250, a compression coil spring 260, and a clip plate 270.

The mirror base 190 is made of resin and has an L-shaped cross section. The mirror base 190 has a fixing portion 192, a base portion 194, and hole portions 196. The fixing portion 192 is fixed to a vehicle, more specifically, a car door. The base portion 194 is connected to a lower side surface of the fixing portion 192. The hole portions 196 are formed on an upper surface of the base portion 194.

The shaft 200 is made of an aluminum alloy or the like, and has a lower portion to be fitted to the base portion 194. Also, the shaft 200 has an upper portion which penetrates a lower portion of the housing 210 to be housed in the housing 210. The mirror unit 220 is fitted to the housing 210 so as to occlude an aperture of the housing 210 with a mirror 222. Angular adjustment of the mirror unit 220 is achieved by manual control through a pivot mechanism (not shown), remote manual control through a wire, a controller knob (not shown) and the like, or remote control through a power unit mechanism (not shown).

As shown in FIG. 4, the shaft 200 has a flange 202, a spindle 204, and convex portions 206. The flange 202 abuts on a lower surface of the base portion 194 of the mirror base 190. The spindle 204 extends upward from the flange 202 to penetrate the base portion 194 and the lower portion of the housing 210. The convex portions 206 are formed in a plurality of positions (in three positions) on a circumference of the flange 202. The hole portions 196 are formed on the base portion 194 in positions to be opposed to the convex portions 206 in the state where the shaft 200 is fitted to the mirror base 190. The shaft 200 is fitted to the mirror base 190 so as not to turn relative to the mirror base 190 by fitting the convex portions 206 into the hole portions 196, respectively.

The convex portion 206 of the shaft 200 has a dent on an upper surface thereof. The washers 240 are made of either hard resin or metal, and are fitted into the lower portion of the housing 210 in positions to be opposed to the convex portions 206 in the state where the shaft 200 penetrate the lower portion of the housing 210. Each washer 240 has a dent on a lower surface thereof. One part of the ball 230 is fitted into the dent of either the convex portion 206 or the washer 240. In the state where the convex portions 206 are respectively fitted into the hole portions 196, the housing 210 turns around the shaft 200 by use of the balls 230 if the housing 210 is manually operated. In this event, the housing 210 is temporarily fixed to the mirror base 190 when the balls 230 are housed in the dents of either the washers 240 or the convex portions 206.

The housing 210 attaches the balls 230 by pressure to the base portion 194 of the mirror base 190 or the convex portions 206 by use of the push nut 250, the compression coil spring 260, and the clip plate 270. The push nut 250 is fitted into an annular engaging groove 208 formed in the spindle 204. The clip plate 270 is formed of a metal washer and is fixed to an upper surface of the lower portion of the housing 210. The compression coil spring 260 is disposed and compressed between the push nut 250 and the clip plate 270. In this configuration, the housing 210 attaches the balls 230 to the base portion 240 or the convex portions 206 by elastic force of the compression coil spring 260. Accordingly, the housing 210 turns around the shaft 200 without wobbling. Moreover, since the shaft 200 is fixed to the mirror base 190 by the elastic force of the compression coil spring 260, it is not necessary to use screws.

However, in the manual mirror device 180, the number of components is increased because the washers 240 are fitted into the lower portion of the housing 210 to reduce friction between the balls 230 and the housing 210. Such an increase incurs a weight increase of the device and complication of an assembly operation. Moreover, the dents formed on the convex portions 206 and on the washers 240 incur complication of a processing operation.

SUMMARY OF THE INVENTION

An object of the present invention is to provide a manual mirror device which is capable of achieving weight reduction and simplification of an assembly operation by reducing the number of components, and of achieving simplification of a processing operation.

To attain the foregoing object, the present invention provides a manual mirror device comprising: a mirror base to be fixed to a vehicle; a shaft penetrating the mirror base; a housing turning integrally with the shaft; an elastic member generating elastic force for attaching the shaft and the housing to the mirror base rotatably; a mirror unit with a mirror to be fitted to the housing; a first engaging unit provided on a surface of the shaft opposed to the mirror base; and a second engaging unit provided on a surface of the mirror base opposed to the shaft, wherein the mirror unit is fixed to at least one of an operated position and a folded position by engaging the first engaging unit with the second engaging unit.

According to the present invention, the housing is turned or stopped by adjusting a state of engagement between the first engaging unit and the second engaging unit by manual operation. Therefore, additional components such as balls or washers used for turning the housing are not required. As a result, it is possible to achieve weight reduction of the device and simplification of an assembly, and to achieve simplification of a processing operation.

DESCRIPTION OF THE PREFERRED EMBODIMENTS

An embodiment of the present invention will be described with reference to FIGS. 5 to 13. Here, an X axis, a Y axis, and a Z axis are defined as a longitudinal direction of a mirror base, a width direction of the mirror base, and a height direction of the mirror base, respectively. The X axis, the Y axis, and the Z axis are orthogonal to one another.

Figure 5:
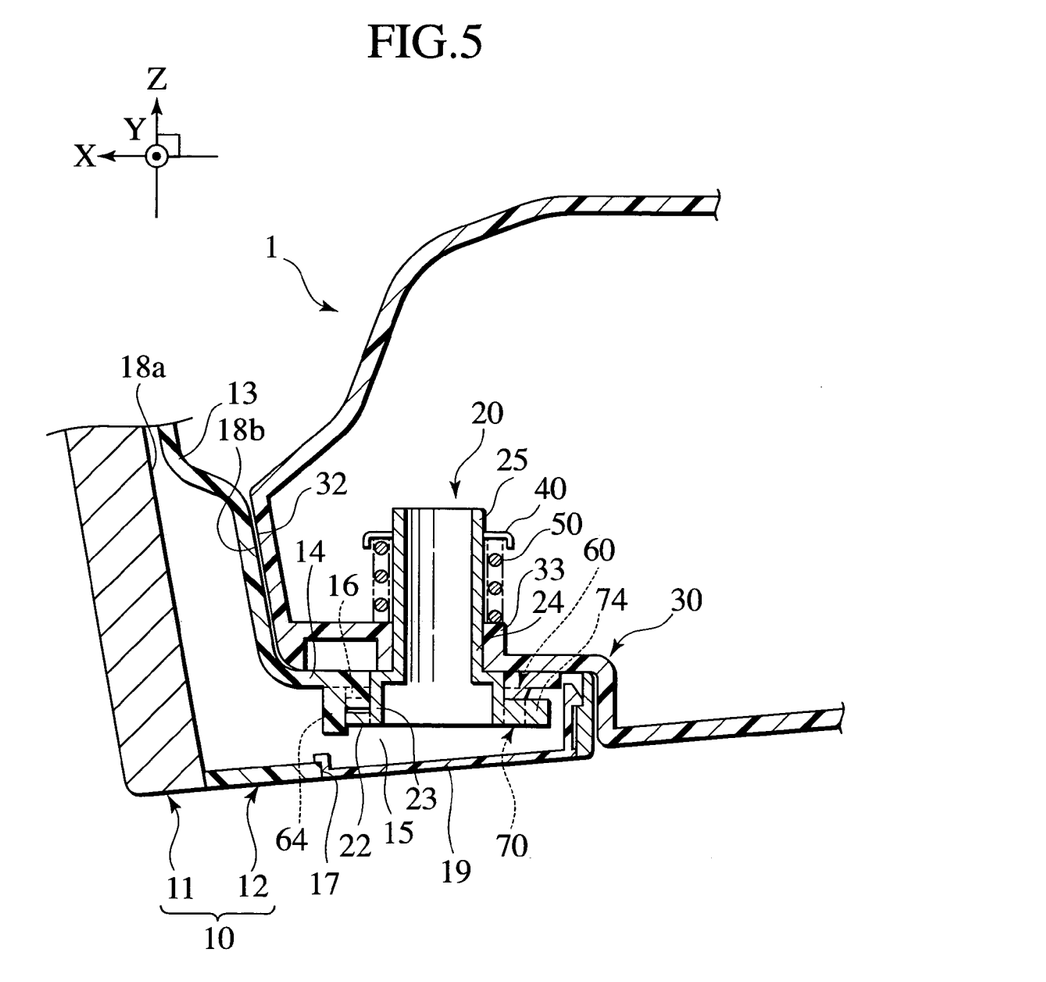
FIG. 5 is a cross-sectional view of a manual mirror device according to an embodiment of the present invention.

As shown in FIG. 5, a manual mirror device 1 includes a mirror base 10, a shaft 20, a housing 30, a support 33, a mirror unit (not shown), a push nut 40, and a compression coil spring 50.

Figure 12A:
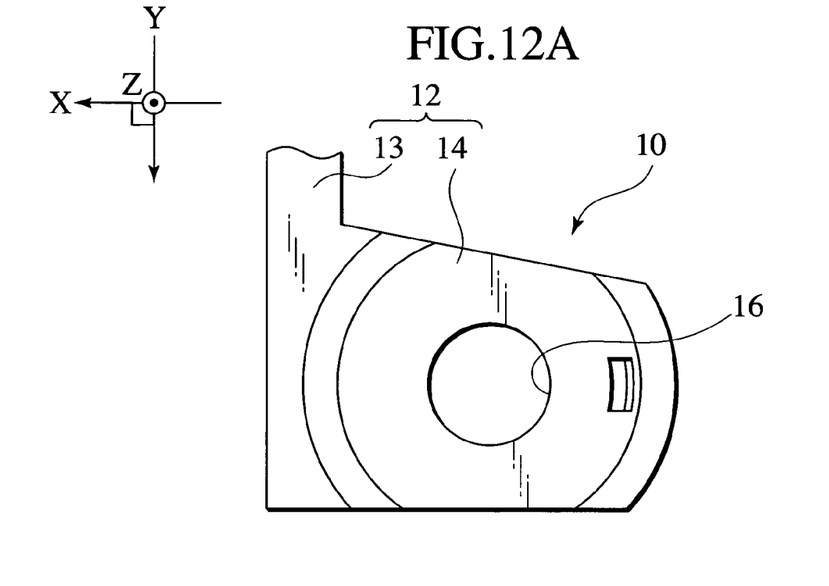
FIG. 12A is a top plan view of the mirror base according to the embodiment of the present invention.

The mirror base 10 is made of resin and has a similar shape to the mirror base 190 of the manual mirror device 180 (see FIG. 3). The mirror base 10 has a fixing portion 11 and a base portion 12. The fixing portion 11 has a triangular shape and extends approximately parallel to a Y-Z plane. The fixing portion 11 is fixed to a vehicle, more specifically, a car door. The base portion 12 has an approximately L-shaped cross section and also has a joint part 13 and a body part 14. The joint part 13 has a first end 18a which extends approximately parallel to the Y-Z plane and is integrally joined to the fixing portion 11. Also, the joint part 13 has a second end 18b which is opposite to the first end 18a and hollows in a +X direction. The body part 14 extends approximately parallel to an X-Y plane, and has a base end which is integrally joined to the joint part 13 and a free end of a curved shape. The body part 14 has a hollow 15 in the interior thereof. Also, the body part 14 has an opening portion 16 which is circularly opened in a +Z direction on an upper surface side (a +Z side) thereof (see FIG. 12A), and an aperture 17 which is opened in a −Z direction on a lower surface side (a −Z side) thereof (see FIG. 12B). The aperture 17 is occluded by a lid 19 when the device is in use.

Figure 6:
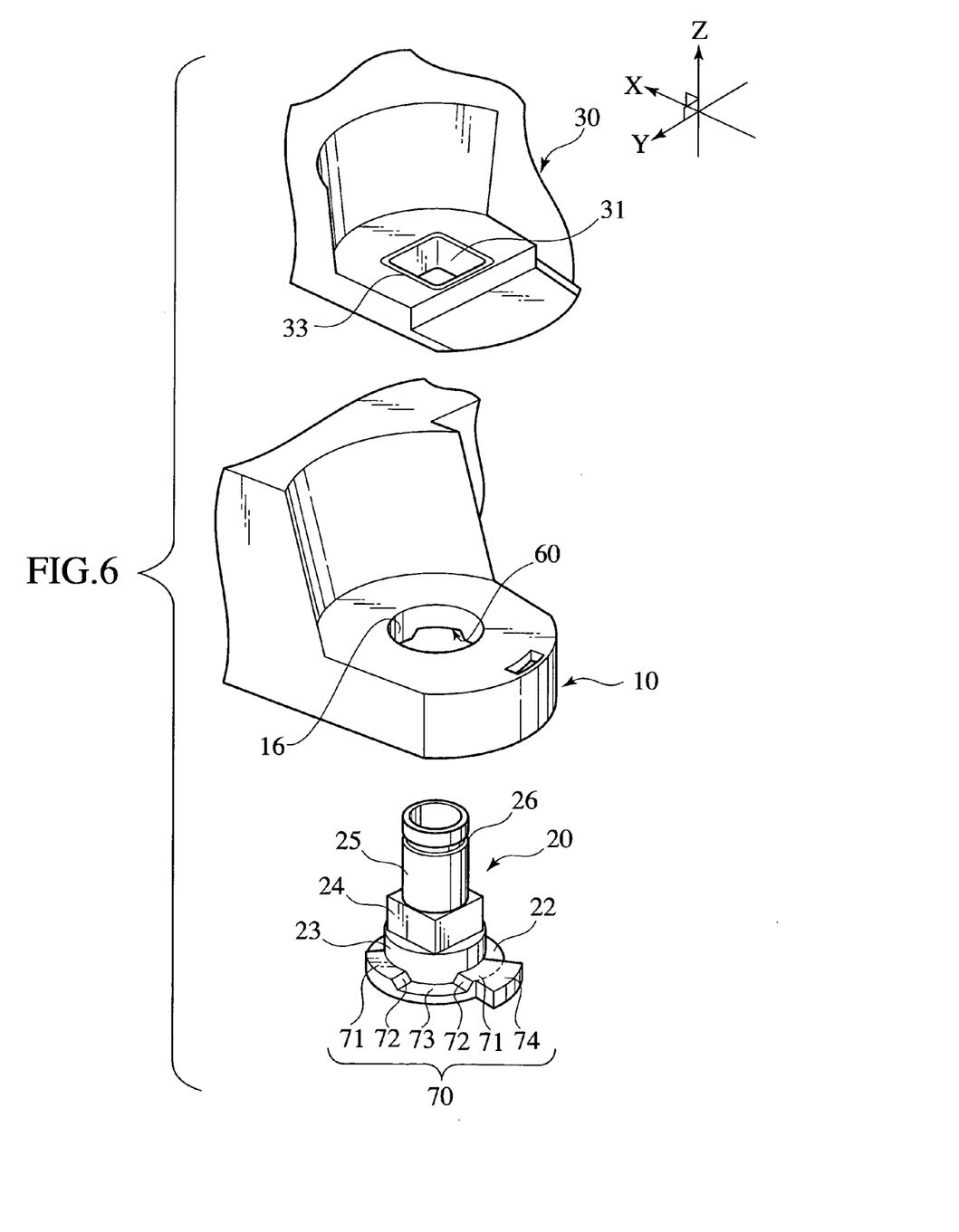
FIG. 6 is an exploded perspective view of the manual mirror device according to the embodiment of the present invention.
Figure 7:
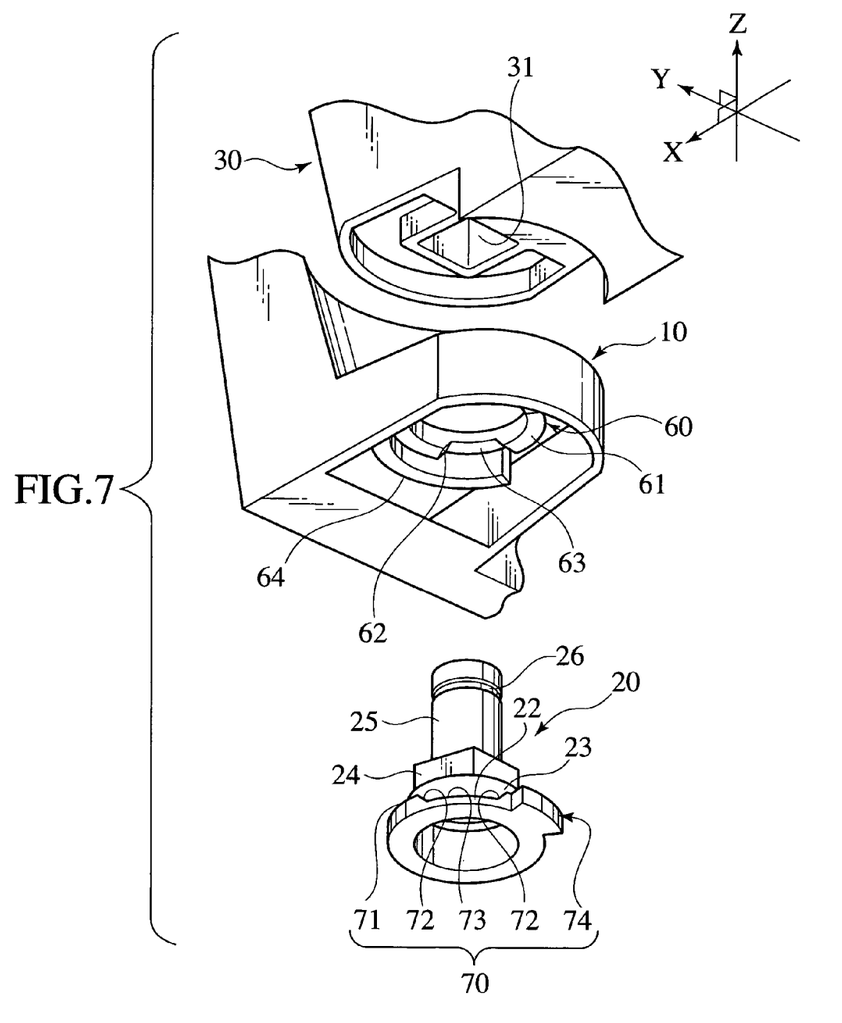
FIG. 7 is another exploded perspective view of the manual mirror device according to the embodiment of the present invention.

The shaft 20 is made of an aluminum alloy or the like, and extends along the Z axis. As shown in FIGS. 6 and 7, the shaft 20 is formed into a hollow shape and has a fitting portion 22, a turning portion 23, a coupling portion 24, and a spindle 25. In the shaft 20, the fitting portion 22, the turning portion 23, the coupling portion 24, and the spindle 25 are integrally stacked in this order in the +Z direction.

Figure 9A:
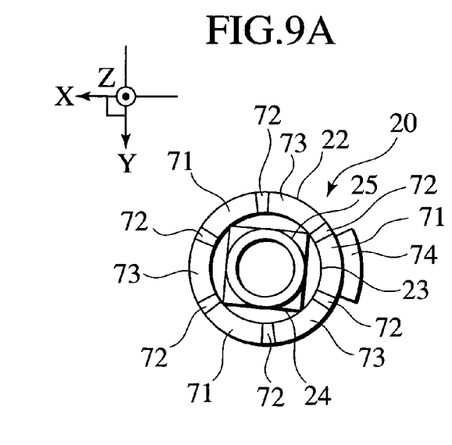
FIG. 9A is a top plan view of a shaft according to the embodiment of the present invention.
Figure 9B:
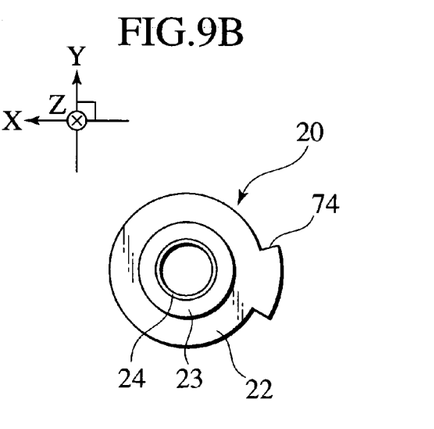
FIG. 9B is a bottom plan view of the shaft according to the embodiment of the present invention.

As shown in FIGS. 9A and 9B, the fitting portion 22 is formed into a ring shape and has an outside diameter which is greater than other portions of the shaft 20 in terms of an X-Y cross section. An engaging unit 70 is provided on an upper surface (the +Z side) of the fitting portion 22. The engaging unit 70 is formed into an uneven shape in a circumferential direction of the fitting portion 22. The engaging unit 70 has upper surfaces 71, inclined surfaces 72, and bottom surfaces 73. In this embodiment, three upper surfaces 71, six inclined surfaces 72, and three bottom surfaces 73 are provided. It should be noted that the number of each type of surfaces is not limited to the foregoing.

A convex portion of the engaging unit 70 is provided so as to extend, from the upper surface of the fitting portion 22, in the +Z direction and has an inner peripheral surface which abuts on an outer peripheral surface of a lower portion (the −Z side) of the turning portion 23. The upper surface 71 corresponds to an upper surface of the convex portion. A concave portion of the engaging unit 70 is integrally coupled to the convex portion adjacent thereto and is provided so as to extend, from the upper surface of the fitting portion 22, in the +Z direction. The bottom surface 73 corresponds to a bottom surface of the concave portion. An inner side surface of the concave portion corresponds to the inclined surface 72, which connects the upper surface 71 and the bottom surface 73 adjacent thereto. In this embodiment, as shown in FIG. 9A, a unit arranging the upper surface 71, the inclined surface 72, the bottom surface 73, and the inclined surface 72 in this order is formed as one set, and three sets are evenly disposed in a turning direction of the shaft 20. A stopper 74 is provided in an extending manner on an outer peripheral surface of the engaging unit 70. The stopper 74 is provided so as to extend, from an outside peripheral surface of a particular convex portion and from an outside peripheral surface of the fitting portion 22 located below (the −Z side) the particular convex portion, in a radial direction of the fitting portion 22.

The turning portion 23 is formed into a cylindrical shape and has a lower outer peripheral surface which is connected to the inner peripheral surface of the fitting portion 22. The coupling portion 24 is formed into a cuboid which has a square shape in terms of an X-Y cross section, and has flat outer side surfaces. As shown in FIG. 9A, in terms of a lower surface (the −Z side) of the coupling portion 24, four vertexes of the lower surface are located on an outer periphery of an upper surface of the turning portion 23. The spindle 25 is formed into a cylindrical shape and has an outside diameter which is smaller than other portions of the shaft 20. In terms of a lower surface (the −Z side) of the spindle 25, an outer periphery of the spindle 25 abuts on respective edges on an upper surface of the coupling portion 24. A ring-shaped engaging groove 26 for fitting the push nut 40 therein is formed in an upper portion of the spindle 25.

Figure 11:
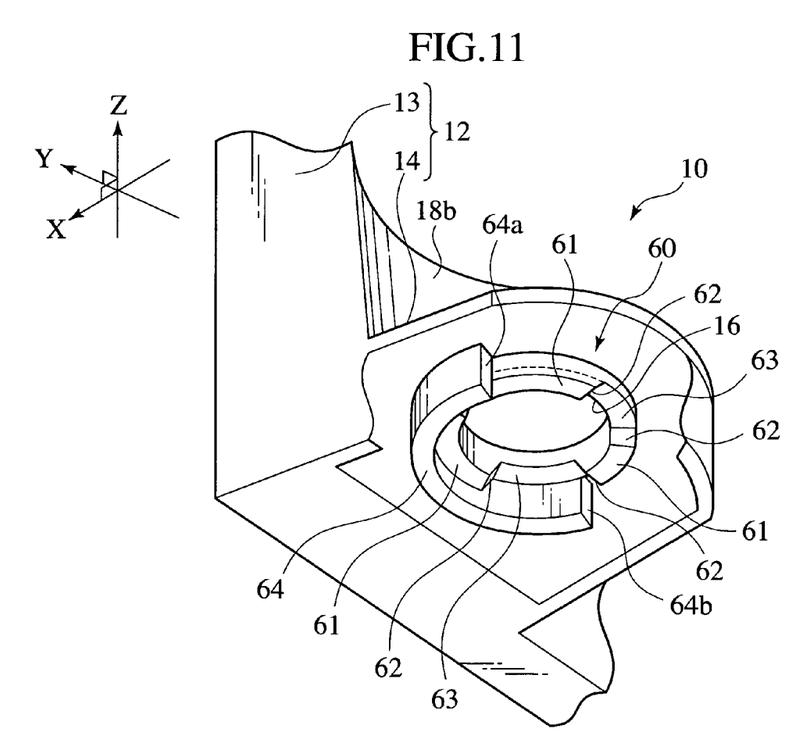
FIG. 11 is a perspective view of a mirror base according to the embodiment of the present invention.
Figure 12B:
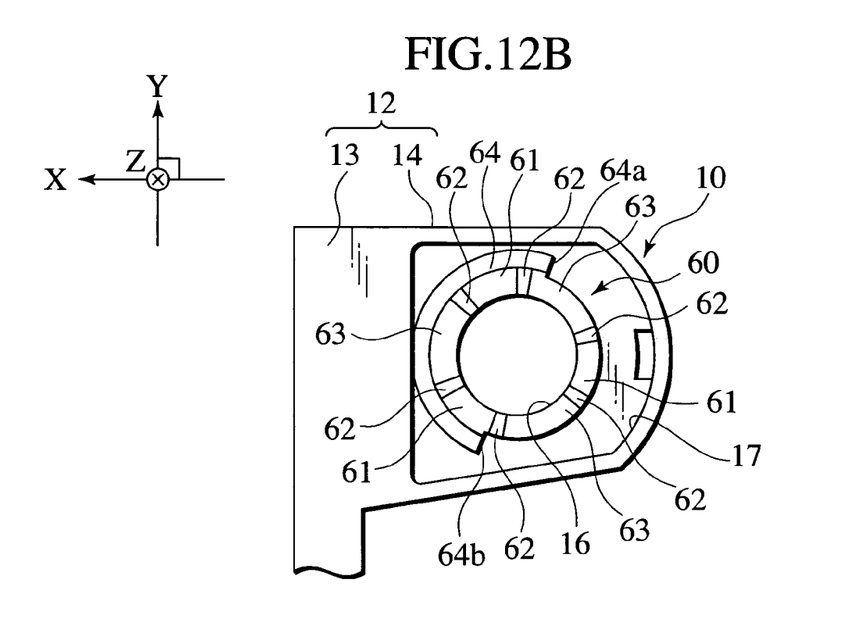
FIG. 12B is a bottom plan view of the mirror base according to the embodiment of the present invention.

The turning portion 23 is rotatably fitted into the opening portion 16 of the body part 14 of the mirror base 10. An inside diameter and an outside diameter of the opening portion 16 are equal to an outside diameter of the turning portion 23 and the outside diameter of the fitting portion 22, respectively. The fitting portion 22, the engaging unit 70, and the stopper 74 are housed in the hollow 15 of the body part 14 of the mirror base 10. As shown in FIG. 5, an engaging unit 60 is formed on a lower surface of the opening portion 16. The engaging unit 60 is formed into an uneven shape in a circumferential direction of the opening portion 16. As shown in FIGS. 11 and 12B, the engaging unit 60 has bottom surfaces 61, inclined surfaces 62, and upper surfaces 63. In this embodiment, three bottom surfaces 61, six inclined surfaces 62, and three upper surfaces 63 are provided. It should be noted that the number of each type of surfaces is not limited to the foregoing.

A convex portion of the engaging unit 60 is provided so as to extend, from a lower surface (the −Z side) of the opening portion 16, in the −Z direction. The convex portion has the same height as the concave portion of the engaging unit 70. The bottom surface 61 corresponds to an upper surface of the convex portion. A concave portion of the engaging unit 60 is integrally coupled to the convex portion adjacent thereto and is provided so as to extend, from the lower surface of the opening portion 16, in the −Z direction. The concave portion has the same height as the convex portion of the engaging unit 70. The upper surface 63 corresponds to a bottom surface of the concave portion. An inner side surface of the concave portion corresponds to the inclined surface 62, which connects the bottom surface 61 and the upper surface 63 adjacent thereto. In this embodiment, as shown in FIG. 12B, a unit arranging the bottom surface 61, the inclined surface 62, the upper surface 63, and the inclined surface 62 in this order is formed as one set, and three sets are evenly disposed in the circumferential direction of the opening portion 16.

The bottom surface 61 has the same lengths in the circumferential direction and in the radial direction as the bottom surface 73 of the engaging unit 70. The inclined surface 62 has the same lengths in the circumferential direction and in the radial direction as the inclined surface 72 of the engaging unit 70, and also has the same inclination as the inclined surface 72. The upper surface 63 has the same lengths in the circumferential direction and in the radial direction as the upper surface 71 of the engaging unit 70.

A stopper holder 64 is provided in an extending manner on an outer peripheral surface of the engaging unit 60. The stopper holder 64 is formed into an arc shape which is approximately a half circle, and is provided so as to extend from part of an outer peripheral surface of the opening portion 16 on the base end side of the body part 14 in a radial direction of the opening portion 16. A height of the stopper holder 64 is higher than a sum of a height of the opening portion 16 and a height of the convex portion of the engaging unit 60.

Next, a method of engaging the mirror base 10 with the shaft 20 will be described. As shown in FIG. 7, the shaft 20 is inserted from a lower aperture (the aperture 17) of the mirror base 10 into the follow 15. Then, the turning portion 23 is rotatably fitted into the opening portion 16 and the fitting portion 22 is housed in the hollow 15, by exposing the coupling portion 24 and the spindle 25 of the shaft 20 out of the mirror base 10 from an upper aperture (the opening portion 16) of the mirror base 10.

Figure 8:
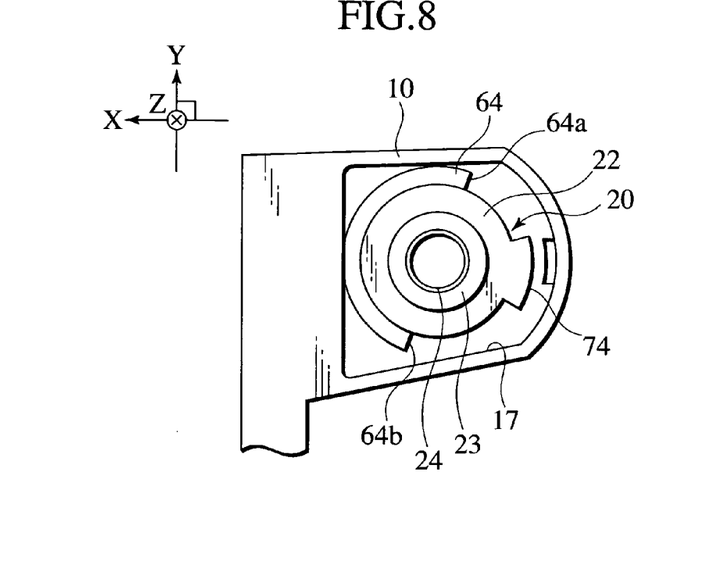
FIG. 8 is a bottom plan view of the manual mirror device according to the embodiment of the present invention.

In this state, the shaft 20 is rotatably fitted to the mirror base 10 by engaging the engaging unit 70 on the shaft 20 with the engaging unit 60 on the mirror base 10 (see FIG. 8). More specifically, the convex portions and the concave portions of the engaging unit 70 are engaged with the concave portions and the convex portions of the engaging unit 60, respectively. At this time, the bottom surfaces 61, the inclined surfaces 62, and the upper surfaces 63 of the engaging unit 60 abut on the bottom surfaces 73, the inclined surfaces 72, and the upper surfaces 71 of the engaging unit 70, respectively. The stopper holder 64 is located in the engaging unit 60 on the base end side of the body part 14. The convex portion provided with the stopper 74 is engaged with the concave portion of the engaging unit 60 which is disposed on the opposite side of the stopper holder 64 (on the free end side of the body part 14).

The housing 30 is made of resin and has a similar shape to the housing 210 of the manual mirror device 180 (see FIG. 3). The housing 30 is supported by the shaft 20 and is rotatably fitted to the mirror base 10. The mirror unit is formed into a similar shape to the mirror unit 220 of the manual mirror device 180 (see FIG. 3), and is fitted to the housing 30 so as to occlude an aperture of the housing 30 with a mirror (not shown). Angular adjustment of the mirror unit is achieved by manual control through a pivot mechanism (not shown), remote manual control through a wire, a controller knob (not shown) and the like, or remote control through a power unit mechanism (not shown).

Figure 10A:
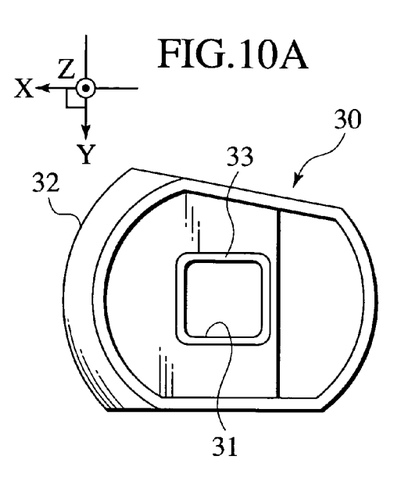
FIG. 10A is a top plan view of a housing according to the embodiment of the present invention.
Figure 10B:
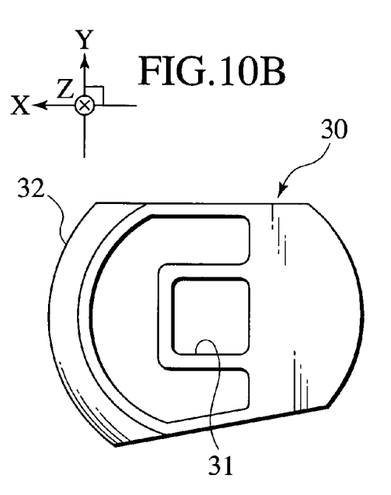
FIG. 10B is a bottom plan view of the housing according to the embodiment of the present invention.

As shown in FIGS. 10A and 10B, the housing 30 has an opening portion 31 having a square open end formed parallel to the X-Y plane. The opening portion 31 has the same height, the same length in the X direction, and the same length in the Y direction as the coupling portion 24 of the shaft 20. Moreover, the housing 30 has an end 32 which protrudes in the +X direction. Here, a convex surface of the end 32 is set to be capable of abutting on the concave surface at the second end 18b of the joint part 13 of the mirror base 10.

Next, a method of engaging the shaft 20 with the housing 30 will be described. In the state where the shaft 20 is fitted to the mirror base 10, the coupling portion 24 is fitted into the opening portion 31 of the housing 30. In this event, the spindle 25 is housed in the housing 30. Based on this configuration, the shaft 20 rotates integrally with the housing 30 when turning the housing 30 by manual operation. Here, the shapes of the opening portion 31 and the coupling portion 24 in the X-Y plane are not limited to squares but may be any non-circular shapes. In the state where the shaft 20 is fitted to the housing 30, the end 32 of the housing 30 slidably abuts on the second end 18b of the joint part 13.

Furthermore, in the state where the shaft 20 is fitted to the housing 30, the housing 30 is fitted to the shaft 20 by use of the support 33, the push nut 40, and the compression coil spring 50. As shown in FIG. 5, the support 33, the push nut 40, and the compression coil spring 50 are arranged parallel to an axial direction (the Z axis) of the spindle 25 of the shaft 20. The support 33 is formed around the opening portion 31. The push nut 40 is fitted into the engaging groove 26 which is formed in the spindle 25 of the shaft 20. The compression coil spring 50 is disposed and compressed between the push nut 40 and the support 33. In this configuration, the shaft 20 is fitted to the mirror base 10 and the housing 30 by elastic force of the compression coil spring 50, and the housing 30 is attached by pressure to the mirror base 10.

Figure 13:
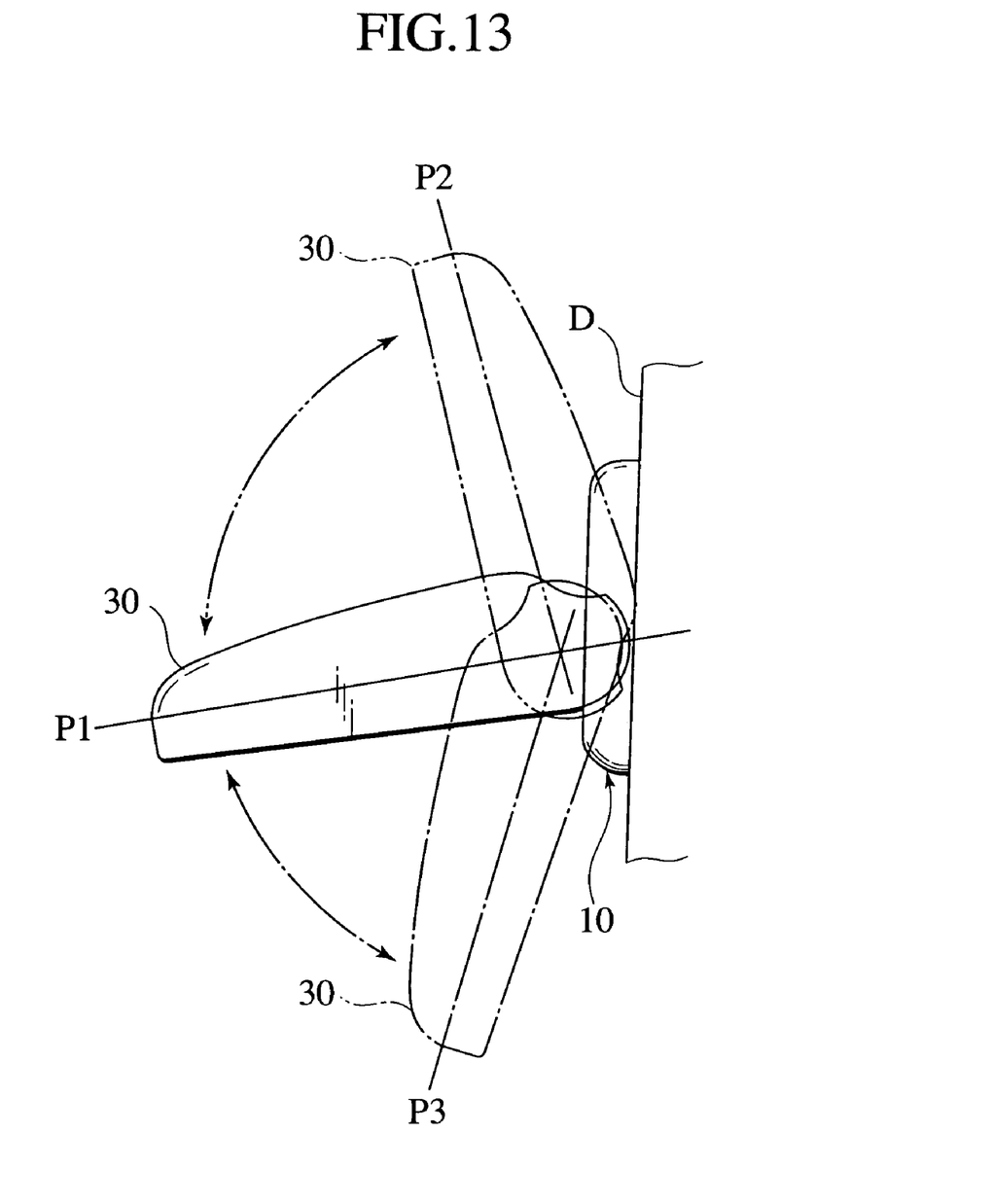
FIG. 13 is an explanatory view of an operated position, a front folded position, and a rear folded position of the housing according to the embodiment of the present invention.

As shown in FIG. 13, the manual mirror device 1 is rotatably fixed to a door D of an automobile via the fixing portion 11 of the mirror base 10. When the housing 30 is located in an operated position P1, the engaging unit 70 of the shaft 20 is attached to the engaging unit 60 of the mirror base 10 by fitting the convex portions of the engaging units 60 and 70 into the concave portions of the engaging units 70 and 60, respectively.

The housing 30 rotates from the operated position P1 to a front folded position P2, when turning force acts on the housing 30 located in the operated position P1 toward a front direction of the automobile by a manual operation or a crash impact. In this event, the engaging unit 70 of the shaft 20 is detached from the engaging unit 60 of the mirror base 10. In this way, the upper surfaces 71 of the engaging unit 70 slide on the inclined surfaces 62 and then the bottom surfaces 61 of the engaging unit 60 toward the +Y direction (see FIG. 11). At this time, the shaft 20 rotates while moving in the direction away from the mirror base 10 and the housing 30 (the −Z direction). The moving of the shaft 20 is forcibly stopped when the stopper 74 abuts on one end 64a of the stopper holder 64 along with the rotation of the shaft 20.

The housing 30 rotates from the operated position P1 to a rear folded position P3, when turning force acts on the housing 30 located in the operated position P1 toward a rear direction of the automobile by a manual operation or a crash impact. In this event, the engaging unit 70 of the shaft 20 is detached from the engaging unit 60 of the mirror base 10. In this way, the upper surfaces 71 of the engaging unit 70 slide on the inclined surfaces 62 and then the bottom surfaces 61 of the engaging unit 60 toward the −Y direction (see FIG. 11). At this time, the shaft 20 rotates while moving in the direction away from the mirror base 10 and the housing 30 (the −Z direction). The moving of the shaft 20 is forcibly stopped when the stopper 74 abuts on the other end 64b of the stopper holder 64 along with the rotation of the shaft 20.

The manual mirror device 1 has the following characteristics.

When the turning force is applied to the housing 30 by the manual operation, the turning force is transferred to the shaft 20. In this way, the engagement between the engaging units 60 and 70 is released, and the upper surfaces 71 of the engaging unit 70 slide on the inclined surfaces 62 and then slide on the bottom surfaces 61 which are adjacent to the inclined surfaces 62. In this event, whereas the shaft 20 turns while moving in the direction away from the mirror base 10 and the housing 30, the shaft 20 is not detached from the mirror base 10 and the housing 30 owing to the elastic force of the compression coil spring 50. Accordingly, an assembled state of the device is maintained during the turning process of the housing 30.

In the fitting process of the shaft 20, after the shaft 20 is inserted from the aperture 17 of the mirror base 10, the turning portion 23 of the shaft 20 is rotatably fitted into the opening portion 16 of the mirror base 10 and the coupling portion 24 of the shaft 20 is fitted into the opening portion 31 of the housing 30. Subsequently, after the compression coil spring 50 is disposed around the spindle 25 of the shaft 20, the push nut 40 is fitted into the engaging groove 26 of the shaft 20 while compressing the compression coil spring 50. In this way, the elastic force is generated on the compression coil spring 50. Accordingly, the shaft 20 is easily fitted to the housing 30 and the mirror base 10.

Since the housing 30 is attached to the mirror base 10 by the elastic force of the compression coil spring 50, the shaft 20 and the housing 30 turn on the upper surface of the body part 14 of the base portion 12 in the mirror base 10 without wobbling.

The housing 30 can be turned or stopped only by forming the engaging units 60 and 70 on the mirror base 10 and the shaft 20, respectively. In this way, it is possible to reduce the number of components for turning and stopping the housing 30. Accordingly, it is possible to achieve weight reduction and simplification of an assembly operation.

In the engaging unit 60, the unit composed of the bottom surface 61, the inclined surface 62, the upper surface 63, and the inclined surface 62 is formed as one set, and three sets are evenly provided in the circumferential direction of the opening portion 16. Meanwhile, in the engaging unit 70, the unit composed of the upper surface 71, the inclined surface 72, the bottom surface 73, and the inclined surface 72 is formed as one set, and three sets are evenly provided in the circumferential direction of the fitting portion 22. Therefore, the shaft 20 can turn or stop smoothly. It should be noted that the number of sets is not limited to three but may be set to an arbitrary number.

Weight reduction of the device is achieved by making the mirror base 10, the shaft 20, and the housing 30 of resin. Moreover, by making the shaft 20 and the housing 30 of abrasion-resistant resin, it is possible to reduce abrasion caused by turning the housing 30 and thereby to achieve improvement in durability. Here, as the abrasion-resistant resin, it is possible to use resin blended with glass beads or glass fibers.

Various modifications are possible in the present invention without limitations to the foregoing embodiment. For example, the stopper 74 and the stopper holder 64 may be formed into pin protrusions which can abut on each other. Alternatively, the stopper 74 and the stopper holder 64 may be omitted. In addition, the cross-sectional shapes of the coupling portion 24 of the shaft 20 and of the opening portion 31 of the housing 30 may be formed into non-circular shapes such as triangles, ellipses, or polygons.

What is claimed is:

1. A manual mirror device comprising:
   a mirror base to be fixed to a vehicle;
   a shaft fitted into the mirror base;
   a housing that turns integrally with the shaft;
   an elastic member that generates an elastic force and rotatably attaches the shaft and the housing to the minor base;

a first engaging unit provided on a surface of the shaft that engages the mirror base; and a second engaging unit provided on a surface of the mirror base that engages the shaft, wherein the mirror unit is fixed in at least one of an operated position and a folded position by engaging the first engaging unit with the second engaging unit, and wherein the shaft includes a coupling portion with a non-circular cross section centered on an axis of the shaft and the housing includes a first opening portion with a non-circular cross section, and wherein the non-circular cross section of the coupling portion fits into the first opening portion.

2. The manual mirror device according to claim 1, wherein the minor base includes a second opening portion, and wherein the shaft further comprising:

a spindle housed in the housing;

a turning portion rotatably fitted into the second opening portion of the mirror base; and a fitting portion having an upper portion that engages a lower surface of the second opening portion.

3. The manual mirror device according to claim 2, wherein the fitting portion is formed into an annular shape.

4. The manual mirror device according to claim 3, wherein the second opening portion is formed into an annular shape.

5. The manual mirror device according to claim 3, wherein an outside diameter of the fitting portion is greater than diameters of other members of the shaft.

6. The manual mirror device according to claim 4, wherein the first engaging unit is provided on the upper surface of the fitting portion and the second engaging unit is provided on a lower surface of the second opening portion.

7. The manual mirror device according to claim 6, wherein the first engaging unit has at least one first convex portion and at least one first concave portion and the second engaging unit has at least one second convex portion and at least one second concave portion.

8. The manual mirror device according to claim 7, wherein an inner side surface of the first concave portion forms a first inclined surface and an inner side surface of the second concave portion forms a second inclined surface.

9. The manual mirror device according to claim 7, wherein the first convex portion and the first concave portion are repeatedly arranged on the upper surface of the fitting portion and the second convex portion and the second concave portion are repeatedly arranged on the lower surface of the second opening portion.

10. The manual mirror device according to claim 7, wherein the mirror unit is located in the operated position when the first convex portion and the first concave portion are engaged with the second concave portion and the second convex portion, respectively.

11. The manual mirror device according to claim 7, further comprising:

a stopper provided so as to extend, from an outside peripheral surface of a particular one of the first convex portions and from an outside peripheral surface of the fitting portion located below the particular first convex portion, in a radial direction of the fitting portion.

12. The manual mirror device according to claim 11, further comprising:

a stopper holder provided so as to extend, from part of an outer peripheral surface of the second opening portion, in a radial direction of the second opening portion.

13. The manual mirror device according to claim 12, wherein in the state where the shaft is fitted to the mirror base, the mirror unit is located in the folded position when the stopper abuts on an end of the stopper holder.

14. The manual mirror device according to claim 2, wherein the turning portion is formed into a cylindrical shape.

15. The manual mirror device according to claim 2, wherein the spindle is formed into a cylindrical shape.

16. The manual mirror device according to claim 15, wherein an outside diameter of the spindle is smaller than diameters of other members of the shaft.

17. The manual mirror device according to claim 15, further comprising a push nut fitted into a side surface of the spindle.

18. The manual mirror device according to claim 17, further comprising a support provided around the first opening portion.

19. The manual mirror device according to claim 18, wherein an elastic force of the elastic member is provided parallel to an axial direction of the spindle and is disposed and compressed between the push nut and the support.

20. The manual mirror device according to claim 1, wherein the mirror base and the shaft are made of abrasion-resistant resin.

* * * * *